US012695492B2

(12) United States Patent
Zirwas et al.

(10) Patent No.: US 12,695,492 B2
(45) Date of Patent: Jul. 28, 2026

(54) ENHANCEMENT OF DATA MAP OF OBJECTS VIA OBJECT SPECIFIC RADIO FREQUENCY PARAMETERS

(71) Applicant: Nokia Technologies Oy, Espoo (FI)

(72) Inventors: Wolfgang Zirwas, Munich (DE); Brenda Vilas Boas, Neubiberg (DE); Oana-Elena Barbu, Aalborg (DK); Zexian Li, Espoo (FI); Luis Guilherme Uzeda Garcia, Massy (FR); Istvan Zsolt Kovacs, Aalborg (DK); Muhammad Majid Butt, Palaiseau (FR)

(73) Assignee: Nokia Technologies Oy, Espoo (FI)

( * ) Notice: Subject to any disclaimer, the term of this patent is extended or adjusted under 35 U.S.C. 154(b) by 211 days.

(21) Appl. No.: 18/288,253

(22) PCT Filed: Apr. 22, 2022

(86) PCT No.: PCT/EP2022/060701
§ 371 (c)(1),
(2) Date: Oct. 25, 2023

(87) PCT Pub. No.: WO2022/229018
PCT Pub. Date: Nov. 3, 2022

(65) Prior Publication Data
US 2024/0214046 A1 Jun. 27, 2024

(30) Foreign Application Priority Data
Apr. 26, 2021 (FI) ..................................... 20215482

(51) Int. Cl.
*H04B 7/06* (2006.01)
*H04B 17/00* (2015.01)
*H04B 17/391* (2015.01)
*H04W 24/10* (2009.01)

(52) U.S. Cl.
CPC ....... *H04B 7/0626* (2013.01); *H04B 17/0087* (2013.01); *H04B 17/3913* (2015.01); *H04W 24/10* (2013.01)

(58) Field of Classification Search
CPC .............. H04B 7/0626; H04B 17/3913; H04B 17/0087; H04W 24/10
See application file for complete search history.

(56) References Cited

U.S. PATENT DOCUMENTS

2002/0126644 A1* 9/2002 Turpin ................. H04B 1/7103
2016/0043883 A1 2/2016 Zirwas

FOREIGN PATENT DOCUMENTS

WO WO 2019/138156 A1 7/2019
WO WO 2021/191176 A1 9/2021

OTHER PUBLICATIONS

Zirwas et al., "Channel Prediction for B4G Radio Systems," 2006 IEEE 63$^{rd}$ Vehicular Technology Conference, Jun. 2, 2013, pp. 1-5.

* cited by examiner

*Primary Examiner* — Ronald B Abelson
(74) *Attorney, Agent, or Firm* — McCarter & English LLP

(57) ABSTRACT

Devices, methods and computer programs for enhancing a data map of objects via object specific radio frequency parameters are disclosed. Channel state information measurements for a surrounding of a network node and a corresponding radio channel simulation are accessed. A set of radio frequency parameters for each interaction point is estimated.

20 Claims, 12 Drawing Sheets

200

BVDM: building vector data model
MPC: multipath component

| Ray Tracing CIR | Estimated CIR (UE or gNB) | Location [x, y, z] |
|---|---|---|
| Alpha = [alpha1,..., alphaL]<br>Tau = [tau1,..., tauL]<br>Detha = [detha1,..., dethaL] | Alpha' = [alpha1,..., alphaL]<br>Tau' = [tau1,..., tauL]<br>Detha' = [detha1,..., dethaL] | L1 = [x1, y1, z1] |
| ... | ... | ... |

901    902    903

900

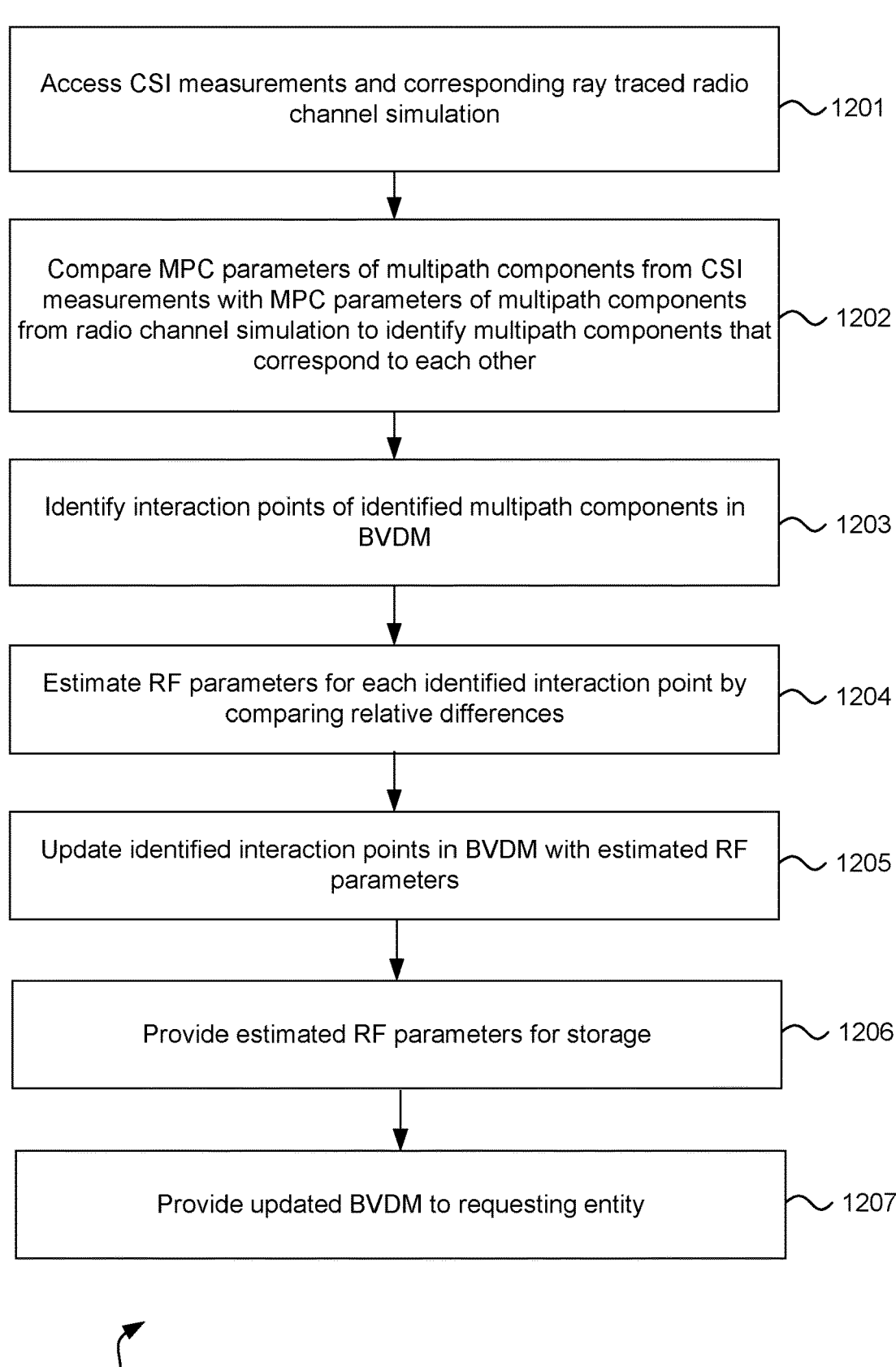

Access CSI measurements and corresponding ray traced radio channel simulation ⌇1201

Compare MPC parameters of multipath components from CSI measurements with MPC parameters of multipath components from radio channel simulation to identify multipath components that correspond to each other ⌇1202

Identify interaction points of identified multipath components in BVDM ⌇1203

Estimate RF parameters for each identified interaction point by comparing relative differences ⌇1204

Update identified interaction points in BVDM with estimated RF parameters ⌇1205

Provide estimated RF parameters for storage ⌇1206

Provide updated BVDM to requesting entity ⌇1207

ENHANCEMENT OF DATA MAP OF OBJECTS VIA OBJECT SPECIFIC RADIO FREQUENCY PARAMETERS

CROSS REFERENCE TO RELATED APPLICATION

This patent application is a U.S. National Stage application of International Patent Application Number PCT/EP2022/060701 filed Apr. 22, 2022, which is hereby incorporated by reference in its entirety, and claims priority to Finland Patent Application No. 20215482 filed 26 Apr. 2021.

TECHNICAL FIELD

The disclosure relates generally to communications and, more particularly but not exclusively, to enhancing a data map of objects via object specific radio frequency parameters.

BACKGROUND

It is likely that in the future it will be common to run a digital twin of e.g. a factory or a mirror world in a smart base station (gNB) of a fifth generation (5G) new radio (NR) wireless network or in a cloud. Such a digital twin or a mirror world would have accurate building vector data maps (BVDMs) from the surrounding of their served radio cells. Geometries for such BVDMs may be generated e.g. from digital map data, LIDAR data, radar data, or user equipment (UE) feedback training.

A smart gNB can use such BVDMs for ray tracing. For example, in combination with radio frequency (RF) fingerprinting more accurate positioning or improved handover decisions may become possible.

However, at least in some situations it may currently not be possible to provide sufficiently accurate information about RF parameters e.g. at interaction points of the BVDMs in which a multipath component is reflected, diffracted or transmitted.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of an apparatus comprises at least one processor, and at least one memory including computer program code. The at least one memory and the computer program code are configured to, with the at least one processor, cause the apparatus to at least perform:

accessing channel state information measurements performed by a mobile node for a surrounding of a network node and accessing a corresponding radio channel simulation; and estimating a set of radio frequency, RF, parameters for each interaction point.

In an example embodiment, alternatively or in addition to the above-described example embodiments, the at least one memory and the computer program code are further configured to, with the at least one processor, cause the apparatus to perform:

comparing multipath component, MPC, parameters of multipath components from the accessed channel state information measurements with MPC parameters of multipath components from the accessed radio channel simulation to identify multipath components that correspond to each other; and identifying interaction points of the identified multipath components in a data map of objects in the surrounding of the network node.

The estimating of the set of RF parameters is performed by comparing relative differences between the MPC parameters of the multipath components from the accessed channel state information measurements and the MPC parameters of the multipath components from the accessed radio channel simulation.

In an example embodiment, alternatively or in addition to the above-described example embodiments, the at least one memory and the computer program code are further configured to, with the at least one processor, cause the apparatus to perform:

updating the identified interaction points in the data map of objects with the estimated sets of RF parameters.

In an example embodiment, alternatively or in addition to the above-described example embodiments, the at least one memory and the computer program code are further configured to, with the at least one processor, cause the apparatus to perform:

providing the estimated sets of RF parameters for storage to at least one of: the network node or a cloud-based storage.

In an example embodiment, alternatively or in addition to the above-described example embodiments, the estimated sets of RF parameters are provided for storage per interaction point for each multipath component for multiple mobile nodes at multiple locations over given time periods.

In an example embodiment, alternatively or in addition to the above-described example embodiments, the estimated sets of RF parameters provided for storage are for use in at least one of channel estimation and prediction, mobile node localization, and handover.

In an example embodiment, alternatively or in addition to the above-described example embodiments, the at least one memory and the computer program code are further configured to, with the at least one processor, cause the apparatus to perform:

providing the updated data map of objects with the estimated sets of RF parameters to a requesting entity in response to a request from the requesting entity.

In an example embodiment, alternatively or in addition to the above-described example embodiments, the MPC parameters of a multipath component comprise at least one of a delay of the multipath component, an amplitude of the multipath component, a phase of the multipath component, or an angle of arrival of the multipath component.

In an example embodiment, alternatively or in addition to the above-described example embodiments, the data map of objects comprises a building vector data map, BVDM.

In an example embodiment, alternatively or in addition to the above-described example embodiments, the interaction point comprises a point in which a multipath component is reflected, diffracted or transmitted to an object of the data map of objects.

In an example embodiment, alternatively or in addition to the above-described example embodiments, each interaction point is a three-dimensional point.

In an example embodiment, alternatively or in addition to the above-described example embodiments, an RF parameter of the set of RF parameters comprises at least one of a phase shift, a reflection coefficient, a transmission coefficient, or a diffraction coefficient.

In an example embodiment, alternatively or in addition to the above-described example embodiments, the computer program code comprises a first neural network trained to perform the identifying of the multipath components that correspond to each other by comparing the MPC parameters of the multipath components from the accessed channel state information measurements with the MPC parameters of the multipath components from the accessed radio channel simulation.

In an example embodiment, alternatively or in addition to the above-described example embodiments, the computer program code comprises a second neural network trained to perform the estimating of the set of RF parameters for each identified interaction point by comparing the relative differences between the MPC parameters of the multipath components from the accessed channel state information measurements and the MPC parameters of the multipath components from the accessed radio channel simulation.

An example embodiment of an apparatus comprises means for performing:

accessing channel state information measurements performed by a mobile node for a surrounding of a network node and accessing a corresponding radio channel simulation; and estimating a set of radio frequency, RF, parameters for each interaction point.

An example embodiment of a method comprises:

accessing, by an apparatus, channel state information measurements performed by a mobile node for a surrounding of a network node and accessing a corresponding radio channel simulation; and estimating, by the apparatus, a set of radio frequency, RF, parameters for each interaction point.

In an example embodiment, alternatively or in addition to the above-described example embodiments, the method further comprises:

comparing, by the apparatus, multipath component, MPC, parameters of multipath components from the accessed channel state information measurements with MPC parameters of multipath components from the accessed radio channel simulation to identify multipath components that correspond to each other; and identifying, by the apparatus, interaction points of the identified multipath components in a data map of objects in the surrounding of the network node.

The estimating of the set of RF parameters is performed by comparing relative differences between the MPC parameters of the multipath components from the accessed channel state information measurements and the MPC parameters of the multipath components from the accessed radio channel simulation.

In an example embodiment, alternatively or in addition to the above-described example embodiments, the method further comprises updating, by the apparatus, the identified interaction points in the data map of objects with the estimated sets of RF parameters.

In an example embodiment, alternatively or in addition to the above-described example embodiments, the method further comprises providing, by the apparatus, the estimated sets of RF parameters for storage to at least one of: the network node or a cloud-based storage.

In an example embodiment, alternatively or in addition to the above-described example embodiments, the estimated sets of RF parameters are provided for storage per interaction point for each multipath component for multiple mobile nodes at multiple locations over given time periods.

In an example embodiment, alternatively or in addition to the above-described example embodiments, the estimated sets of RF parameters provided for storage are for use in at least one of channel estimation and prediction, mobile node localization, and handover.

In an example embodiment, alternatively or in addition to the above-described example embodiments, the method further comprises providing, by the apparatus, the updated data map of objects with the estimated sets of RF parameters to a requesting entity in response to a request from the requesting entity.

In an example embodiment, alternatively or in addition to the above-described example embodiments, the MPC parameters of a multipath component comprise at least one of a delay of the multipath component, an amplitude of the multipath component, a phase of the multipath component, or an angle of arrival of the multipath component.

In an example embodiment, alternatively or in addition to the above-described example embodiments, the data map of objects comprises a building vector data map, BVDM.

In an example embodiment, alternatively or in addition to the above-described example embodiments, the interaction point comprises a point in which a multipath component is reflected, diffracted or transmitted to an object of the data map of objects.

In an example embodiment, alternatively or in addition to the above-described example embodiments, each interaction point is a three-dimensional point.

In an example embodiment, alternatively or in addition to the above-described example embodiments, an RF parameter of the set of RF parameters comprises at least one of a phase shift, a reflection coefficient, a transmission coefficient, or a diffraction coefficient.

In an example embodiment, alternatively or in addition to the above-described example embodiments, a first neural network is trained to perform the identifying of the multipath components that correspond to each other by comparing the MPC parameters of the multipath components from the accessed channel state information measurements with the MPC parameters of the multipath components from the accessed radio channel simulation.

In an example embodiment, alternatively or in addition to the above-described example embodiments, a second neural network is trained to perform the estimating of the set of RF parameters for each identified interaction point by comparing the relative differences between the MPC parameters of the multipath components from the accessed channel state information measurements and the MPC parameters of the multipath components from the accessed radio channel simulation.

An example embodiment of a computer program comprises instructions for causing an apparatus to perform at least the following:

accessing channel state information measurements performed by a mobile node for a surrounding of a network node and accessing a corresponding radio channel simulation; and estimating a set of radio frequency, RF, parameters for each interaction point.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings:

FIG. 6 illustrates an example machine learning implementation;

FIG. 7 illustrates another example machine learning implementation;

FIG. 12 shows an example embodiment of the subject matter described herein illustrating a method.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
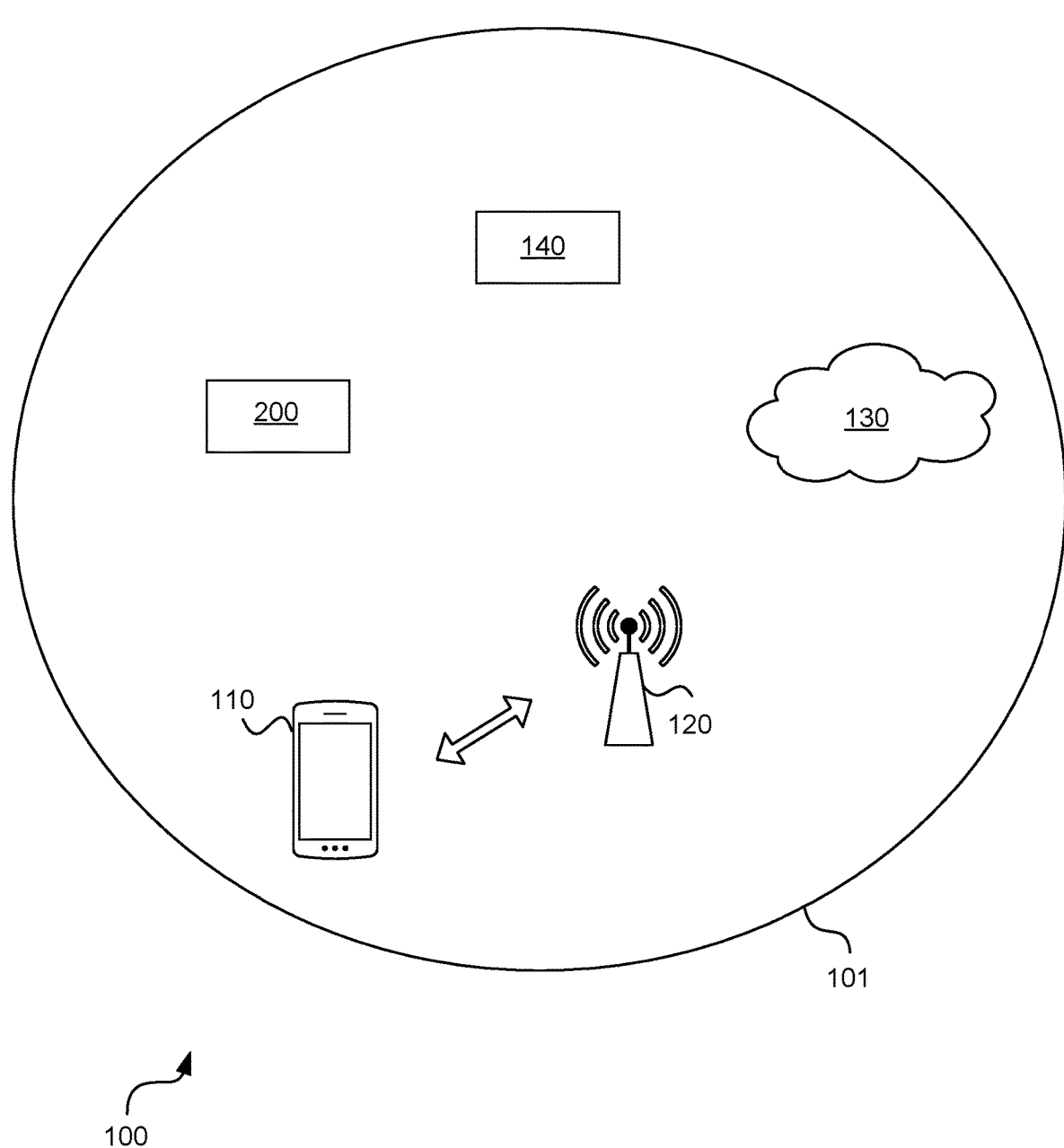
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a fifth generation (5G) new radio (NR) network 101. An example representation of the system 100 is shown depicting a mobile node 110, a network node 120, a cloud-based storage 130, a requesting entity 140, and an apparatus 200. The 5G NR network 101 may be configured to serve diverse service types and/or use cases, and may logically be seen as comprising one or more networks The mobile node 110 may include e.g. a mobile phone, a smartphone, a tablet computer, a smart watch, or any handheld or portable device. The mobile node 110 may also be referred to as a user equipment (UE). The network node 120 may comprise a base station. The base station 120 may include e.g. a fifth-generation base station (gNB) or any such device suitable for providing an air interface for mobile nodes to connect to a wireless network via wireless transmissions.

In the following, various example embodiments will be discussed. At least some of these example embodiments may allow mapping estimated multipath components from a noisy channel state information (CSI) measurement to same multipath components generated from e.g. a ray tracing tool. Objectives may include learning from field measurements radio frequency (RF) characteristics or parameters of multipath component interaction points in a known building vector data map (BVDM).

In other words, at least some of these example embodiments may allow enhancing the building vector data maps of a digital twin (e.g. an industrial factory) or a mirror world of a smart gNB by adding object specific accurate RF characteristics, such as RF frequency and angle dependent reflection-, transmission-, and/or diffraction coefficients. These RF coefficients may also cover the RF frequency and angle dependent effects of reflections at clusters and the impact of the geometrical structure of such a cluster.

Typical RF characteristics or parameters may include building materials, reflection coefficients, diffraction coefficients, and/or phase shifts at multipath component (MPC) interaction points in a known BVDM.

Figure 3:
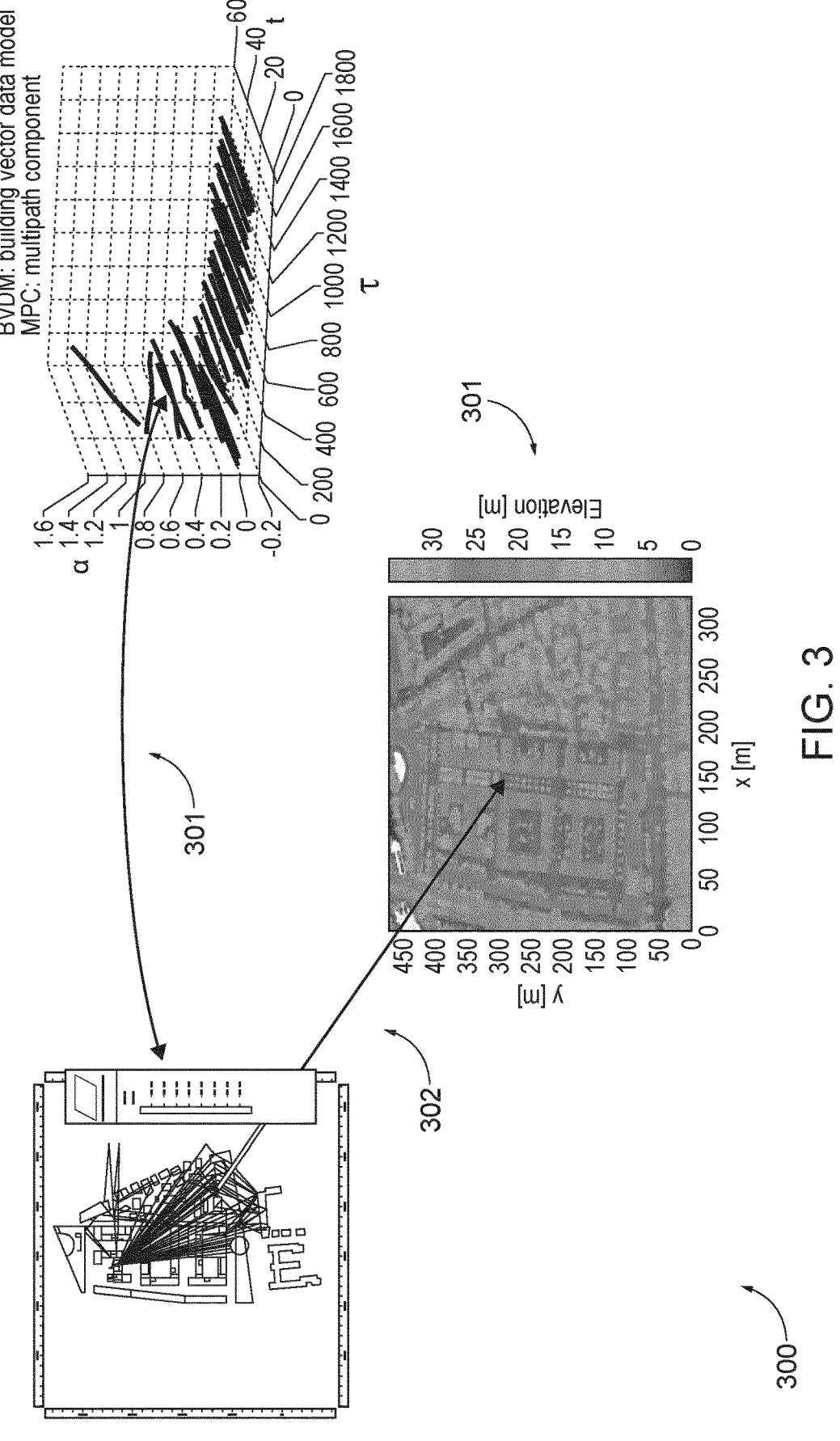
FIG. 3 illustrates an overview of an example embodiment of the subject matter described herein.

FIG. 3 illustrates an overview diagram 300 of an example embodiment of the subject matter described herein.

Figure 5:
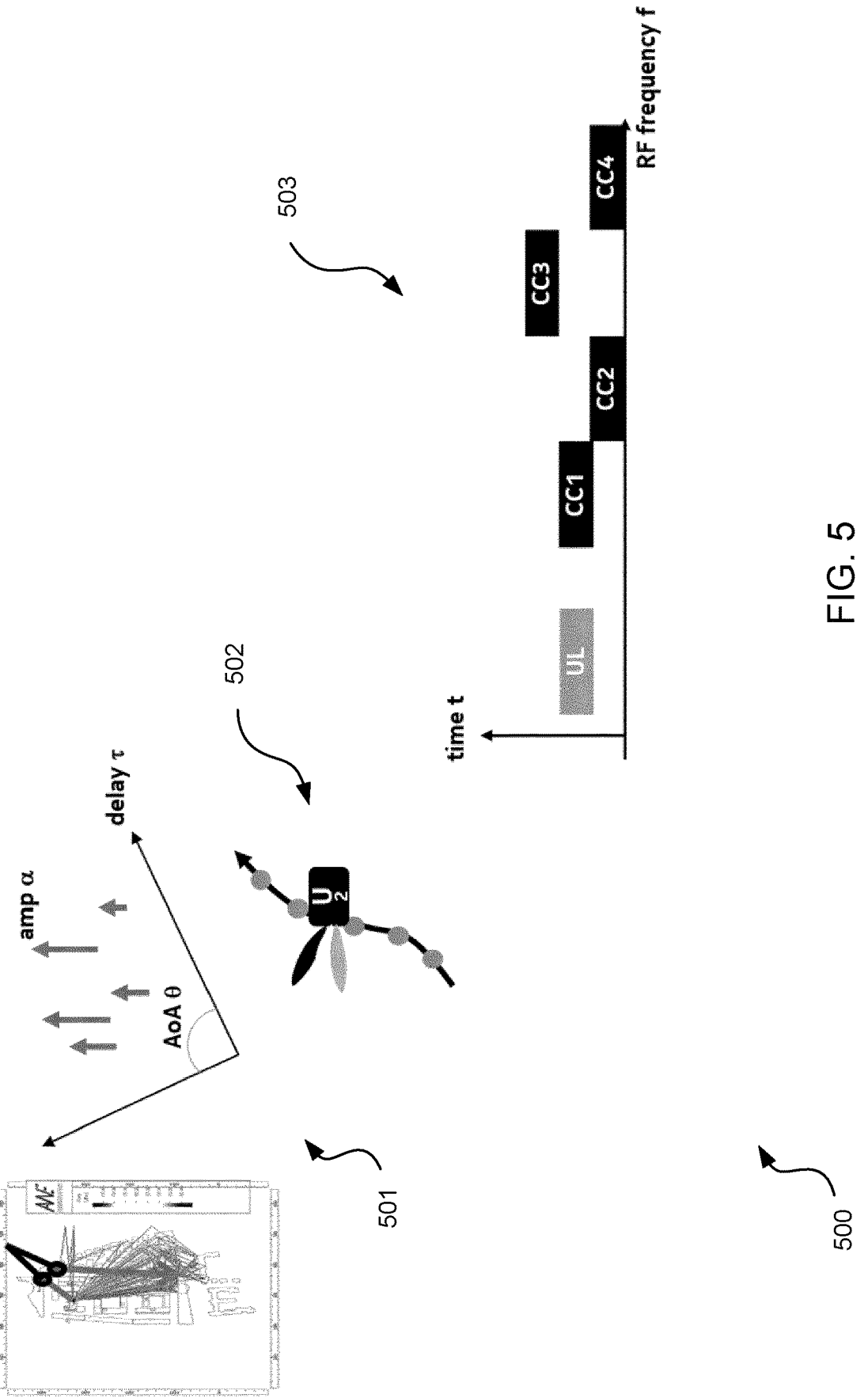
FIG. 5 illustrates maximizing estimation accuracy.

Step 301 of diagram 300 comprises identifying identical MPCs from the ray tracing tool and from the measurements (as further illustrated in FIG. 5). Step 301 may include machine learning (ML) based mapping of measured and ray traced multipath components by comparison of their parameters (e.g. delays, amplitudes and angle of arrivals), as will be discussed in more detail below.

Figure 4:
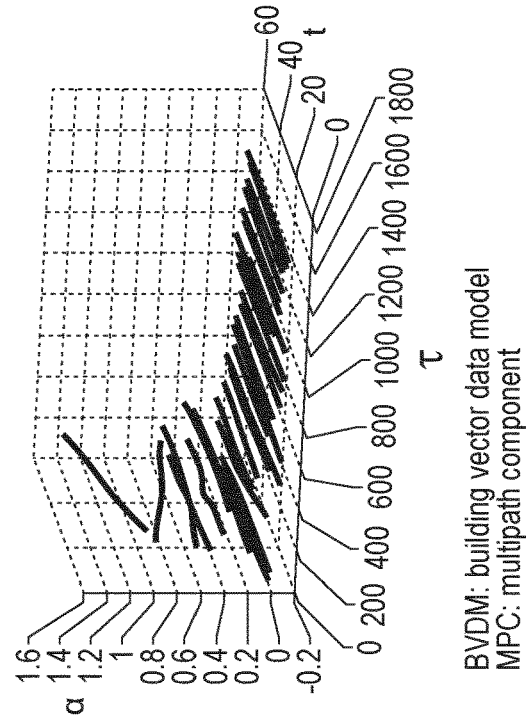
FIG. 4 illustrates a more detailed view of mapping a multipath component to its interaction points.
Figure 4:
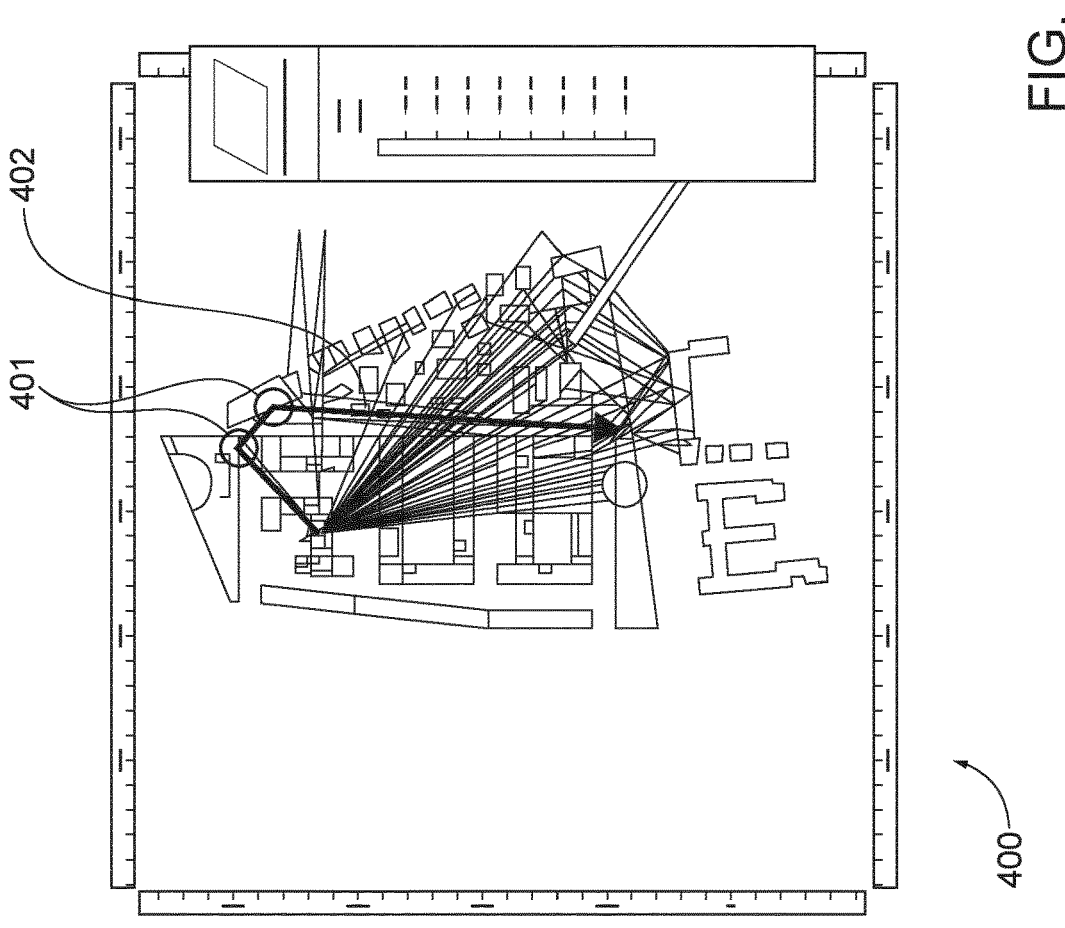

Step 302 of diagram 300 comprises mapping the interaction points for the identified MPCs into the BVDM (as further illustrated in FIG. 4).

That is, diagram 400 of FIG. 4 provides a more detailed illustration of the mapping of a MPC to its interaction points, in this case two reflection points 401 (illustrated with the circles). These may be identified e.g. from the ray tracer and the BVDM. These ray traced MPCs may be mapped, 402, to the MPCs as identified from the measured CSI. For that purpose, the ray traced MPC parameters on the left may be compared with the estimated or inferred parameters as given on the right side. There, the evolution of the MPC delays T (x-axis) over time t (y-axis) with signal strength a (z-axis) may be seen, as derived from an iterative profiling optimization.

In other words, step 302 of diagram 300 comprises identifying for each mapped multipath component the interaction points within the BVDM. These interaction points may be found e.g. from the ray tracing tool, which may directly know such x-, y-, and z-coordinates in which a ray traced MPC interacts with the BVDM. In case of a correct mapping of a ray traced MPC and a measured MPC, the interaction point is the same for the measured MPC. Down-selection of a subset of all identified interaction points may be performed, where the subset may be for the most reliable estimated and most relevant interaction points.

Step 303 of diagram 300 comprises estimating the RF characteristics at the interaction points including phase shift, reflection coefficients, transmission coefficients, diffraction coefficients, and/or the like. By observing the relative difference of the strength, phase and delay of a certain MPC with respect to the other MPCs, the RF characteristics of the related MPC reflection and diffraction interaction points may be estimated. For that purpose, relative differences from the ray traced and the estimated MPC parameters may be compared. In this case, the ray traced MPC parameters may include only geometrical effects, while the measured and estimated MPC parameters may include damping and phase shifts due to the reflection, diffraction, or transmission at an interaction point.

Then, at the interaction points the BVDM may be upgraded or updated by the estimated RF frequency and angle of incident dependent RF characteristics. Simultaneously, the BVDM geometries may be retrained as well.

Over time all BVDM elements may be updated by combining reports from multiple UEs containing multiple interaction points and multiple angles of incidents per interaction point.

In an embodiment, a network node 120 and/or a cloud storage 130 may store the estimated RF parameters per interaction point for all MPCs and for a large number of UEs 110 at multiple locations over longer time periods.

This operation may allow a further ML algorithm to combine all this information and to learn the RF characteristics of the BVDM objects in order to map them to individual building structures like windows, doors, roof, trees, etc. An ML based computer vision (CV) analysis may be added, which can identify certain common elements in the BVDM, which can be expected to have similar RF-parameters.

Then, in a first iteration the same RF parameters may be applied from one interaction point of this object to the rest of this element. Over time—when the number of interaction points increases—this additional information may be used to update the parameters and—if needed—to apply the parameters with finer granularity to the sub-areas of a given element.

The BVDM together with the so far learned RF parameters may then be stored at the network node 120 or the edge/cloud storage 130 and it may enable new applications of a digital twin or in a mirror world. For example, it may improve ray tracing simulations for channel estimation and prediction, UE localizations, handover, and other applications.

To summarize, at least some embodiments of estimating and allocating RF characteristics to BVDMs may include several steps including:

i) accurate estimation of MPC parameters based on measured radio channels using e.g. CSI reference signals (RSs), ii) proper mapping of estimated and ray traced MPCs, iii) identification of interaction points, (such interaction points may be 3-dimensional points $(x, y, z)$, where a multipath component is reflected, diffracted or transmitted in the BVDM), and iv) estimation of RF parameters per interaction point.

The overall procedure may be split into several sub-tasks, and each sub-task may be optimized individually.

For example, the mapping of measured and ray traced MPCs may be solved by multiple means in at least some embodiments, as discussed in more detail below. In at least some embodiments, the parameter estimation of the MPCs may be estimated sufficiently accurately in the centimeter (100 ps) range by applying super resolution techniques, such as profiling. Theoretically, the performance is then limited by the fisher information and the cramer rao bound.

Figure 2:
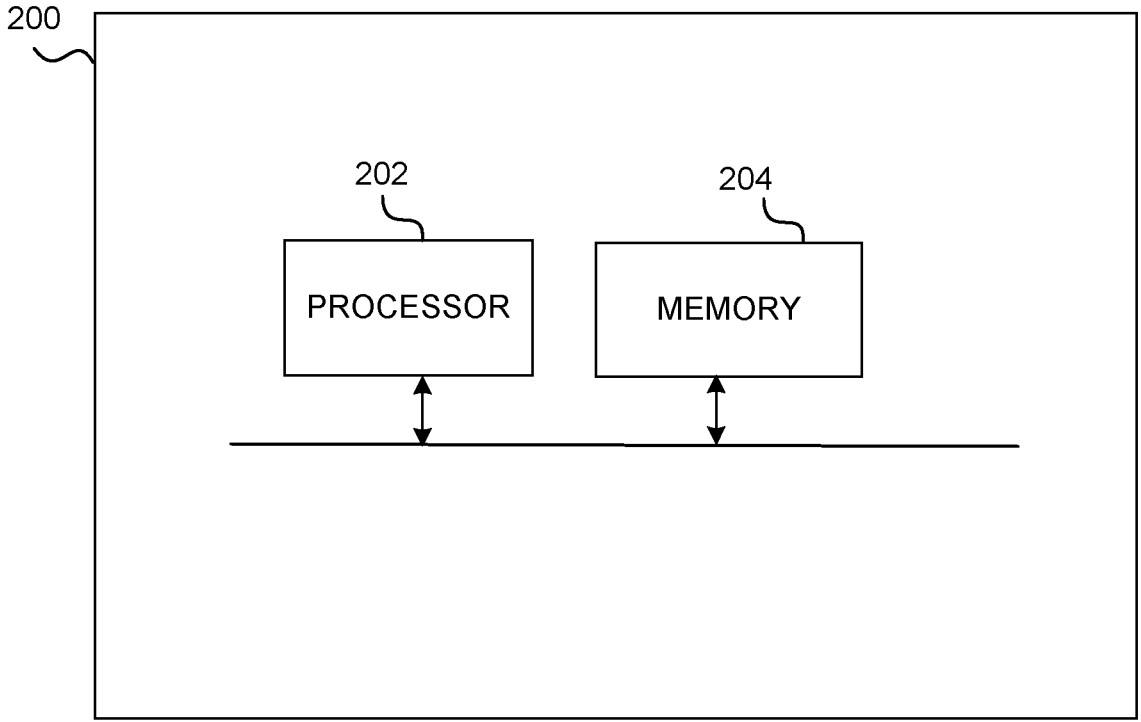
FIG. 2 shows an example embodiment of the subject matter described herein illustrating an apparatus.

FIG. 2 is a block diagram of the apparatus 200, in accordance with an example embodiment.

The apparatus 200 comprises at least one processor 202, and at least one memory 204 including computer program code. The apparatus 200 may also include other elements not shown in FIG. 2.

Although the apparatus 200 is depicted to include only one processor 202, the apparatus 200 may include more processors. In an embodiment, the memory 204 is capable of storing instructions, such as an operating system and/or various applications. Furthermore, the memory 204 may include a storage that may be used to store e.g. at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The apparatus 200 may be a stand-alone device, or it may be integrated e.g. in the mobile node 110 or the network node 120.

The at least one memory 204 and the computer program code are configured to, with the at least one processor 202, cause the apparatus 200 to perform accessing channel state information measurements performed by the mobile node 110 for the surrounding of the network node 120, and accessing a corresponding radio channel simulation, such as a corresponding ray traced radio channel simulation.

The at least one memory 204 and the computer program code may be further configured to, with the at least one processor 202, cause the apparatus 200 to perform comparing multipath component (MPC) parameters of multipath components from the accessed channel state information measurements with MPC parameters of multipath components from the accessed radio channel simulation to identify multipath components that correspond to each other. For example, the MPC parameters of a multipath component may comprise a delay of the multipath component, an amplitude of the multipath component, a phase of the multipath component, and/or an angle of arrival of the multipath component.

As an example, diagram 500 of FIG. 5 illustrates maximizing the estimation accuracy from measured CSI as well as finding an optimal mapping of ray traced and measured MPCs. For the mapping, a 3D plot may be derived from the ray tracer, as shown at 501, where the MPC delays are given as a distance to the origin $(0,0,0)$, the angle of arrival (AoA) is given as the phase relative to the x-axis and the amplitude $\alpha$ is given as the length of the vectors. For the UE 110 measurements, a similar map may be generated for the estimated MPC parameters. To maximize the estimation accuracy, virtual beamforming may be applied to moving UEs as shown at 502, which may maximize AoA accuracy as well as signal-to-interference-plus-noise ratio (SINR) due to beamforming gains. 503 illustrates an enlarged measurement bandwidth, where multiple channel carriers (CCs) are combined to form a larger bandwidth. For frequency-division duplexing (FDD) systems, this may include the combination of an uplink (UL) and downlink (DL) radio channel. A large bandwidth may help to estimate the delays more accurately.

In other words, diagram 500 of FIG. 5 illustrates a typical intended representation of the MPC parameters in the form of amplitude $\alpha_i$, delay $\tau_i$, phase $\varphi_i$, and AoA (or angle of departure, AoD) $\theta_i$ for all relevant MPCs. The intention is to estimate these parameters with sufficient accuracy so that a mapping between the estimated MPCs and the ray traced MPCs becomes possible. There are some options for optimization, such as to applying virtual beamforming at UE side, i.e. to combine for moving UEs measurements from multiple successive locations. These measurements may form a virtual antenna array that may be combined to generate narrow virtual beamformers, which: 1) increases the receive power per MPC, 2) reduces the number of MPCs being received within the narrow beams, 3) allows for accurate AoA estimation, and, 4) suppresses inter cell interference. Different to conventional channel estimation and prediction, here the measurement time may not be relevant so that large—i.e. over multiple UE locations—and very narrow virtual beamformers may be constructed.

Another parameter for accurate MPC parameter estimation may include the measurement bandwidth, which may be as large as possible. At the same time, NR UEs will typically have a limited measurement bandwidth, for example for power saving reasons. As measurement time is not an issue, estimations from multiple successive measurements on different component carriers and/or different bandwidth parts (BWPs) may be combined to achieve an artificially larger RF bandwidth despite limited UE capabilities.

As for virtual beamforming, an ML orchestrator may control virtual beamforming direction so that the MPCs sub-sequentially cover relevant interaction points of interest of the BVDM. The ML orchestrator may organize the related CSI RS transmission from gNB(s) and RF frequency band switching at UE side.

For a given UE virtual beamformer, the UE may estimate a 3-dimensional representation of relevant MPCs as illustrated in top left of diagram 500 of FIG. 5, where the length of the arrows indicates the signal strength, the distance to the origin of the figure represents the delay and the angle indicates the relative AoA with respect to the main lobe virtual beam direction. For the mapping of measured with ray traced MPCs, a similar ray traced MPC representation may be generated for each virtual beamformer. As a fourth dimension, the evolution of the 3-dimensional parameter sets over time may be added for moving UEs. Such information may be of use as it may help to cross-verify parameters like AoA and the delay evolution between measured/estimated and ray traced MPCs, and/or it may help to separate MPCs of similar delay but different AoA.

The at least one memory 204 and the computer program code may be further configured to, with the at least one processor 202, cause the apparatus 200 to perform identifying interaction points of the identified multipath components in a data map of objects in the surrounding of the network node 120. For example, the data map of objects may comprise a building vector data map (BVDM). For example, the interaction point may comprise a point in which a multipath component is reflected, diffracted or transmitted to an object of the data map of objects. In at least some embodiments, each interaction point may be a three-dimensional point. In other words, herein the term "interaction point" is used to refer to points in which a multipath component is reflected, diffracted or transmitted to one of the objects of the data map of objects.

For example, an ML instance may use the measured/estimated and ray traced sets of MPC parameters for known UE positions as derived above to infer the best fitting mapping to the measured and estimated MPCs. This mapping may include alignment of the time and phase between ray traced and measured channel impulse response (CIRs). Based on such a mapping the ray tracing tool may identify the related interaction points in the BVDM for each ray traced MPC. In case of a correct mapping between measured/estimated and ray traced MPCs, the measured MPCs have the same interaction points as identified above. Similarly, the incident angles at the interaction points may be derived from known ray traced MPC data.

The at least one memory 204 and the computer program code are further configured to, with the at least one processor 202, cause the apparatus 200 to perform estimating a set of radio frequency (RF) parameters for each identified interaction point. For example, the estimating of the set of RF parameters may be performed by comparing relative differences between the MPC parameters of the multipath components from the accessed channel state information measurements and the MPC parameters of the multipath components from the accessed radio channel simulation. For example, an RF parameter of the set of RF parameters may comprise a phase shift, a reflection coefficient, a transmission coefficient, and/or a diffraction coefficient.

In other words, depending on the RF effects at the interaction points as identified above, only a part of the signal power will be reflected, diffracted or transmitted together with an element specific phase shift. By comparing the relative amplitudes and phases of all relevant MPCs for the measured/estimated and ray traced MPCs, the combined impact on the amplitude and phases may be inferred from the one-to-few interaction points affecting the real world MPCs. In this example, the ray tracer is assumed to have ideal interactions which do not change the phase nor the amplitude of the MPCs, i.e. they include only the geometrical effects of the given environment and therefore provide an ideal reference. For the mapping of measured/estimated to ray traced MPCs, this means that mainly the delay and angle of arrival values can be used. Later on, a trained BVDM may use the so far learned RF parameters to get a better mapping.

For example, besides learning the RF parameters per MPC, slight delay differences between the identified ray traced and measured MPCs may be used to constantly learn and update the BVDM geometries.

The at least one memory 204 and the computer program code may be further configured to, with the at least one processor 202, cause the apparatus 200 to perform updating the identified interaction points in the data map of objects with the estimated sets of RF parameters.

The at least one memory 204 and the computer program code may be further configured to, with the at least one processor 202, cause the apparatus 200 to perform providing the estimated sets of RF parameters for storage to the network node 120 and/or the cloud-based storage 130. For example, the estimated sets of RF parameters may be provided for storage per interaction point for each multipath component for multiple mobile nodes at multiple locations over given time periods.

In at least some embodiments, the estimated sets of RF parameters provided for storage may be for use in at least one of channel estimation and prediction, mobile node localization, and handover.

In at least some embodiments, storing of the learned RF characteristics of the building vector data map at the network node 120 or in the cloud storage 130, and on request providing the RF enhanced building vector data map to other users 140, may be performed in a predefined format, such as a colored BVDM providing complex reflection, diffraction and/or transmission coefficients per BVDM interaction point, as well as incident angle dependent variation of the parameters.

The at least one memory 204 and the computer program code may be further configured to, with the at least one processor 202, cause the apparatus 200 to perform providing the updated data map of objects with the estimated sets of RF parameters to the requesting entity 140 in response to a request from the requesting entity 140.

In at least some embodiments, the computer program code may comprise a first neural network trained to perform the identifying of the multipath components that correspond to each other by comparing the MPC parameters of the multipath components from the accessed channel state information measurements with the MPC parameters of the multipath components from the accessed radio channel simulation.

In at least some embodiments, the computer program code may comprise a second neural network trained to perform the estimating of the set of RF parameters for each identified interaction point by comparing the relative differences between the MPC parameters of the multipath components from the accessed channel state information measurements and the MPC parameters of the multipath components from the accessed radio channel simulation.

In the following, various implementation options are discussed.

The subtasks of estimation of measured MPC parameters, proper mapping of estimated and ray traced MPCs, identification of interaction points, and estimation of RF parameters per interaction point may be implemented in a set of ML instances.

For the estimation of MPC parameters, to achieve accuracy levels for the relative MPCs delays in the centimeter range, a combination of explicit and iterative algorithms with ML based inferences may be used.

The mapping of measured with the related ray traced MPCs may cause error effects for ray traced and measured MPCs, including impact of BVDM geometry inaccuracies (causing delay variations), limited and simplified BVDM model (causing the ray tracer to have missing or additional MPCs), initially unknown RF characteristics for the BVDM (causing an amplitude and phase mismatch of ray traced MPCs), limited SINR for measurements (causing potential MPC parameter estimation errors), etc. These error effects may be learned from sufficient training data by a ML algorithm.

The identification of interaction points can be simple when there's a proper mapping of the measured with the ray traced MPCs. But generally, a mapping from measured MPC parameters to interaction points is based on mapping probabilities. In such a case, the relative MPC's delays may be mapped so that possible interaction points in the BVDM fit best to the chordal length of the MPCs. For the potential interaction points, estimation errors with respect to MPC delays and BVDM structures may be taken into account. For a large number of MPCs, a trained ML instance is an option for inference of the best fitting interaction points from a very high number of possible mappings.

The final task of mapping of RF characteristics at interaction points to the objects of the BVDM may also be solved by an ML instance. The general assumption is that there are properly mapped MPCs with known parameters and known interaction points as well as its RF parameters, as discussed above. Then, these RF parameters may be mapped to the known interaction points in the BVDM. By learning many interaction points from many UEs over time, the RF characteristics of the whole BVDM will be covered. Multiple different UE measurements may be combined with different sets of interaction points. In addition, object structures in the BVDM may be identified with same—or similar—RF characteristics in the BVDM, like windows or doors by related known ML algorithms. That may result faster in a first BVDM with allocated RF characteristics, which may then be updated with finer granularity over time. Identifying mutual correlations from large amounts of user data for the mapping of RF characteristics to the BVDM may be arranged as a task for an ML instance.

Figure 11:
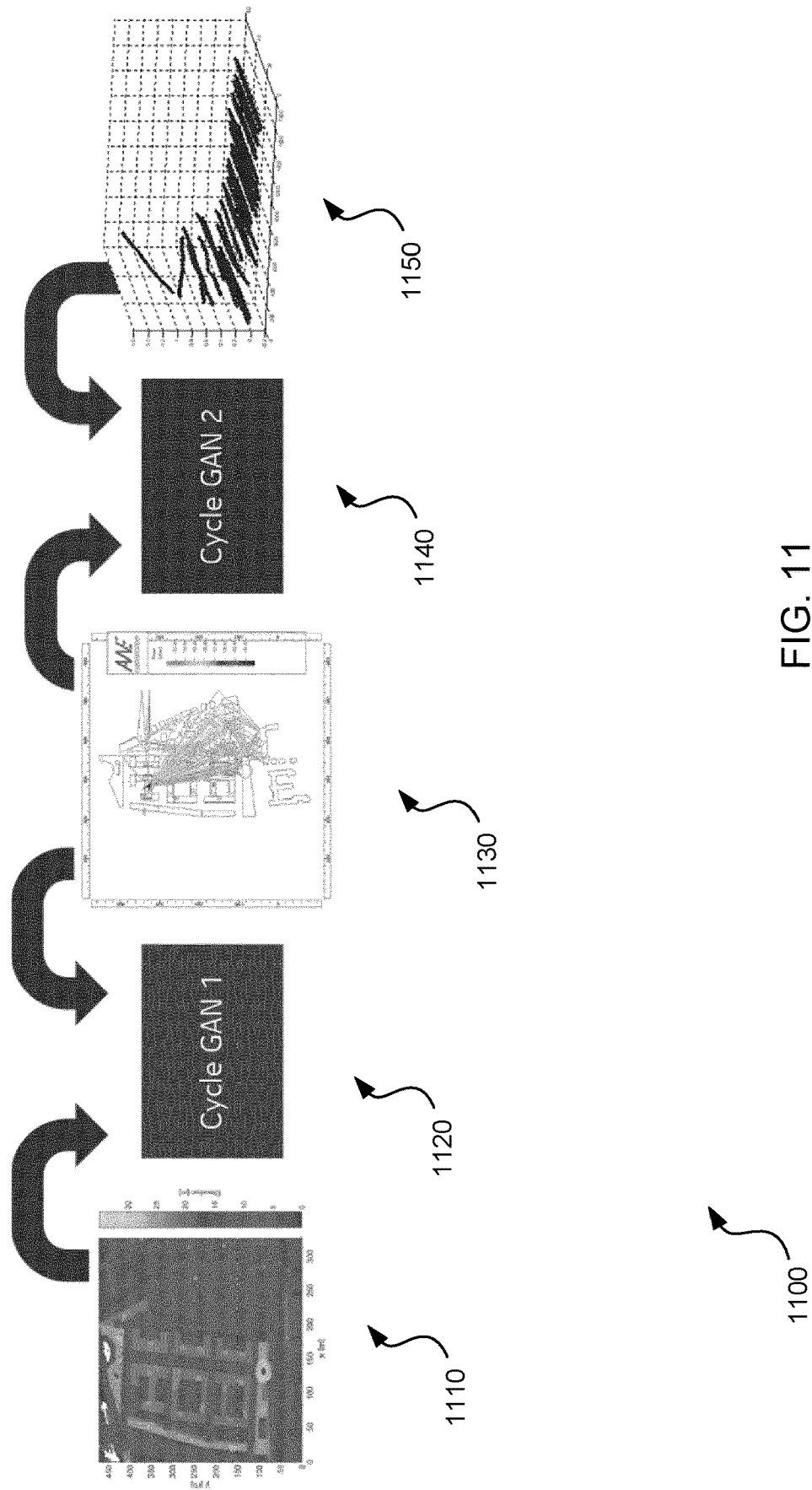
FIG. 11 illustrates at high-level how to apply cyclic GANs for the mapping of RF characteristics to BVDMs.

For example, FIG. 12 illustrates the main idea of cyclic generative adversarial networks (GANs), as well as some possible usage with respect to the mapping of RF characteristics to BVDMs. Diagram 1100 of FIG. 11 is a high-level illustration of how to apply cyclic GANs for the mapping of RF characteristics to BVDMs.

Figure 6:
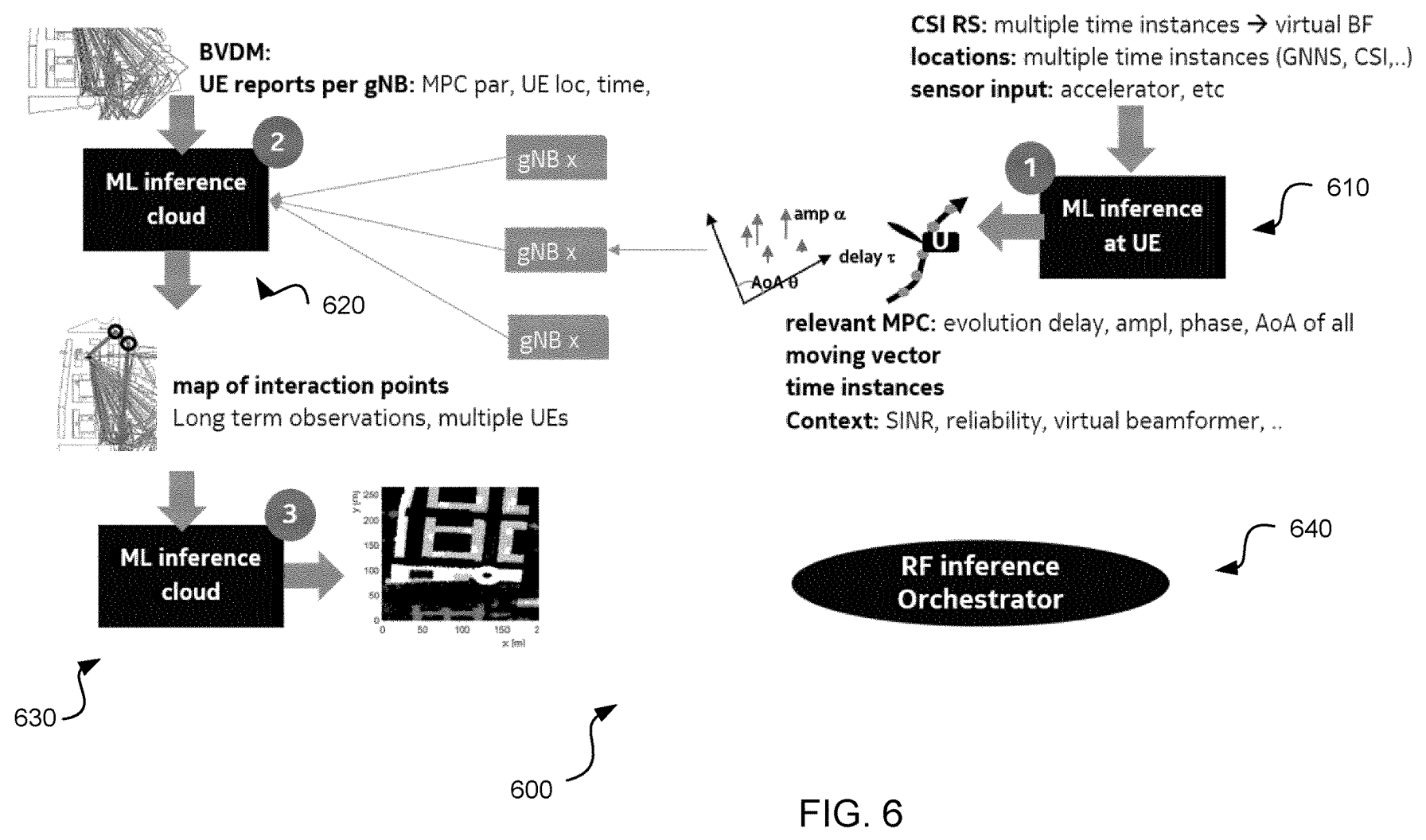
Figure 7:
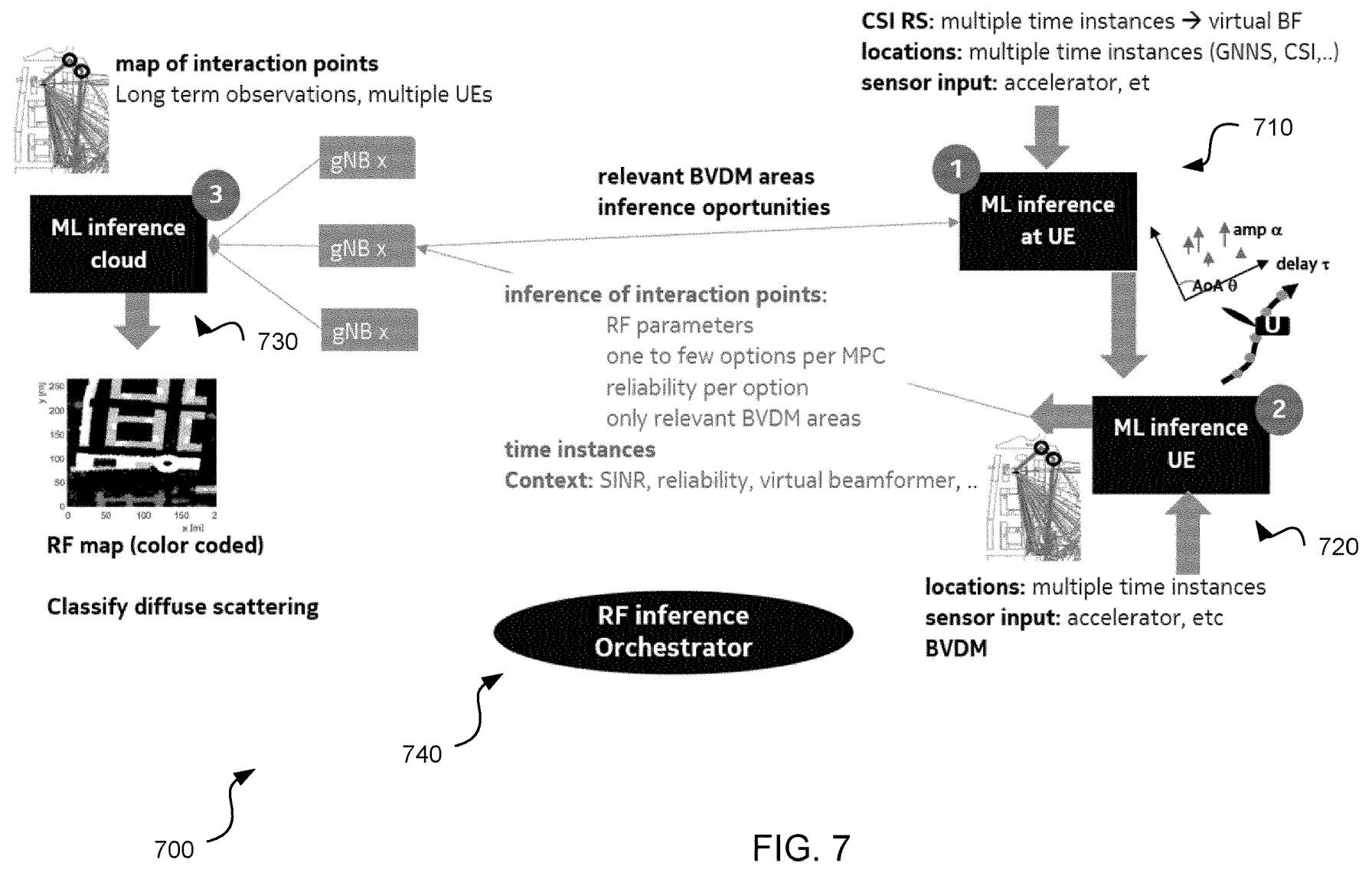

Example implementations of the ML based inferences are illustrated in FIG. 6 (an example implementation and splitting of ML inference functions to UE 110 and gNB 120) and FIG. 7 (an example implementation for ML inference of RF characteristics which leads to a low feedback overhead). In diagram 600 of FIG. 6, at 610 the UE 110 infers the MPC parameters and reports these—together with related information like context, moving vector, time instances—to the gNB 120/cloud 130. There, one ML instance (#2) 620 is for inferring the interaction points and a third ML instance 630 is for estimating the RF characteristics per interaction point and the mapping to the BVDM. In diagram 700 of FIG. 7, the second ML instance 720 has been shifted to the UE 110 side so that the UE 110 can directly report the interaction points plus RF characteristics. Further in diagram 700 of FIG. 7, elements 710 and 730 substantially correspond to elements 610 and 630 of FIG. 6, respectively. This requires the UE 110 to have a BVDM for the environment as it is being assumed, for example, for model-based channel prediction. The increased processing at the UE 110 is then rewarded by a lower feedback overhead from UE 110 to the gNB 120 as now the RF parameters per interaction point can be reported directly based on multiple measurements over longer time periods. The reporting may then be done in a batch mode when there is low network load and good radio channel conditions for the UE. The gNB 120/cloud 130 collects the data from multiple UEs over longer time periods and infers based on this data the BVDM RF characteristics.

In an example embodiment, the UEs may report more or less unprocessed estimates of the radio channels, where the reports may be either in frequency or as explicit time domain CSI. The parameter estimation may be done at the gNB 120 or in the cloud 130.

Generally, a radio channel is reciprocal, so in an alternative embodiment, the CSI may be estimated from an UL sounding reference signal (SRS), e.g. for FDD systems as another means to increase the overall measurement bandwidth, as discussed in connection with FIG. 5.

The UE 110 may report metadata like time, BVDM model, SINR, location, moving vector, virtual beamforming (BF) and bandwidth (BW) enlargement parameters, and/or reliability.

For a given UE 110 location and a given gNB 120 placement, the MPCs may cover a limited set of interaction points within the BVDM. For a faster learning of the whole BVDM, as many MPCs as possible may be included for each UE 110 position. Therefore, all MPCs from multiple transmit/receive points (TRPs) like multiple gNBs, small cells, relays etc. may be evaluated simultaneously, e.g. when all TRPs use orthogonal CSI RSs.

Furthermore, moving UEs may store MPC parameters over larger time periods so that it covers a full trace within the BVDM with varying interaction points and varying incident angles at the interaction points. In such cases, birth and death (emerging and fading) of MPCs may also be utilized, as they may accurately define corner points of objects in the BVDM.

Figure 8:
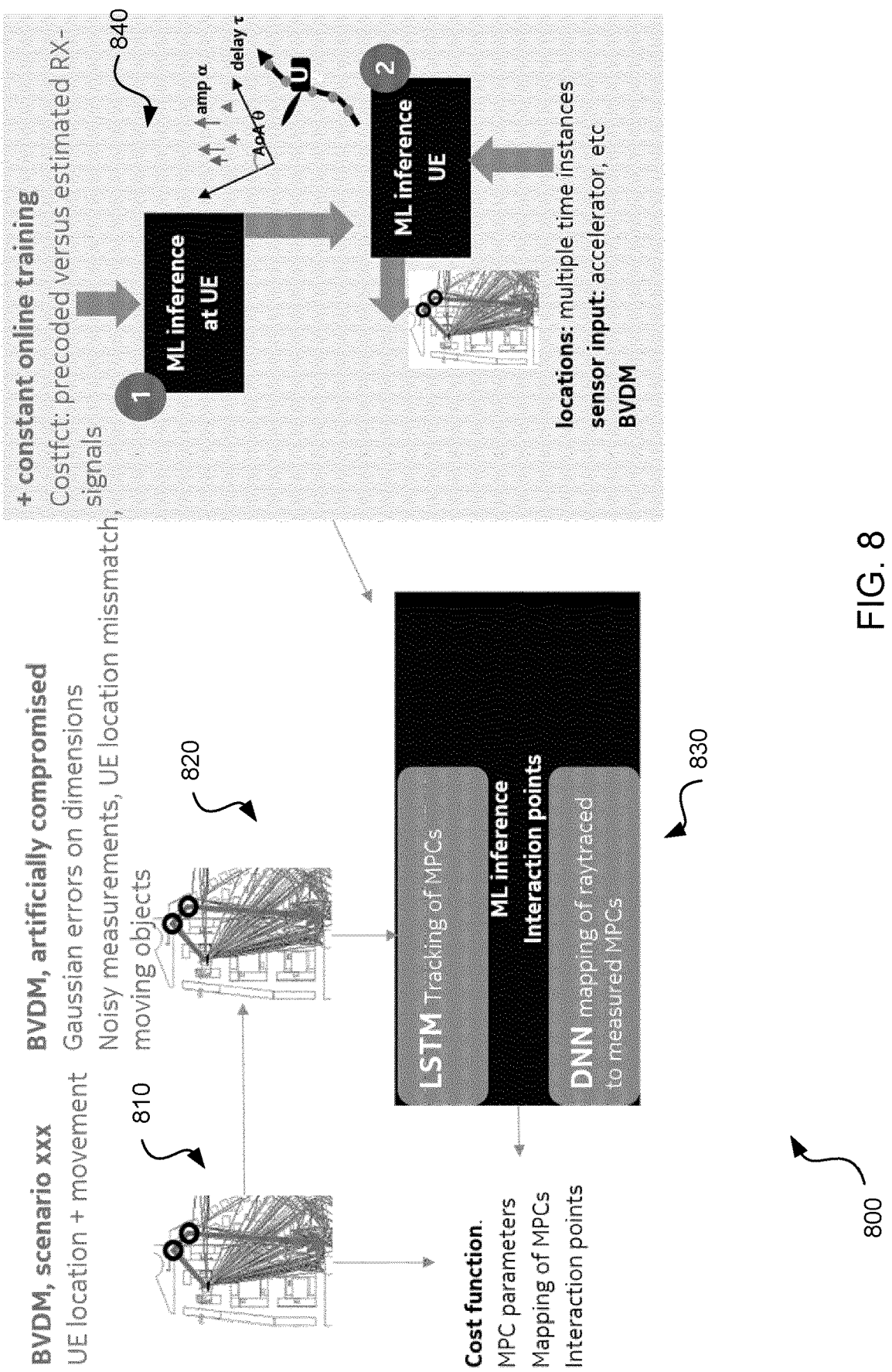
FIG. 8 illustrates yet another example machine learning implementation.

Diagram 800 of FIG. 8 illustrates an example training method for the ML instances. For the training of the ML instances, multiple BVDM scenarios may be artificially generated including RF parameters like reflection and diffraction coefficients, and multiple UE movements may be defined within the BVDM. For each BVDM scenario, some Gaussian errors may be added on the dimensions, including additive white Gaussian noise (AWGN) for the measurements, as well as UE locations mismatches. That way, supervised learning may be enabled, in which the known scenario is the ground truth. The ML instances may then be trained against their cost functions like estimation of the MPC parameters, inferring of interaction points and inferring of RF characteristics per interaction point. In other words, the idea is to start, 810, with offline training by generating an artificial BVDM—or a BVDM from LIDAR data of known scenarios—in a ray tracing tool. Then, one can place and move artificial UEs inside the BVDM and let them infer MPC parameters from noisy CSI estimations, potentially including virtual beamforming as well as bandwidth enlargement, 820. To cover model simplifications and geometrical inaccuracies of the BVDM, artificial errors may be added to the BVDM geometry. The noisy CSI estimations as well as the errored ray traced MPCs may be provided to the ML instances for learning, 830, the MPC parameters, the mapping between ray traced and measured MPCs, the identification of the interaction points, as well as the learning and mapping of the RF characteristics to the BVDM. For the tracking of MPCs, e.g. long short term memory (LSTM) modules may be used, while for the mapping e.g. deep neural networks (DNN) may be used.

During online training 840, the network may use CSI information as reported by the UE 110 for a certain BVDM area, and it may artificially modify some RF parameters for some of the MPC interaction points. Then, this data may be downloaded together with the applied CSI modifications (RF parameter modifications) from the gNB 120 to the UE 110 for retraining of its ML models. At least in some embodiments, using measured CSI information from the current environment may ensure optimum training of the ML algorithm for the current scenario. At least in some embodiments, the controlled altering of CSI parameters may ensure a reliable training process. The whole procedure may be seen as 'partly supervised learning'.

At least in some embodiments, the mapping of RF characteristics may be done by a slow background process lasting for days or weeks so that the related complexity for the ray tracing as well as the ML inferences is a minor issue.

In the following, example ML implementation details are discussed, with reference to FIGS. 6-10, including the related training methods. In these examples, three ML instances are employed. The option of deploying one ML instance at UE side and the others at gNB side is shown in FIG. 6, and the option of two ML instances at UE side and one ML instance at gNB side is shown in FIG. 7.

Figure 9:
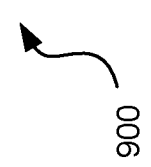
FIG. 9 illustrates an example table of multipath component parameters.
Figure 10:
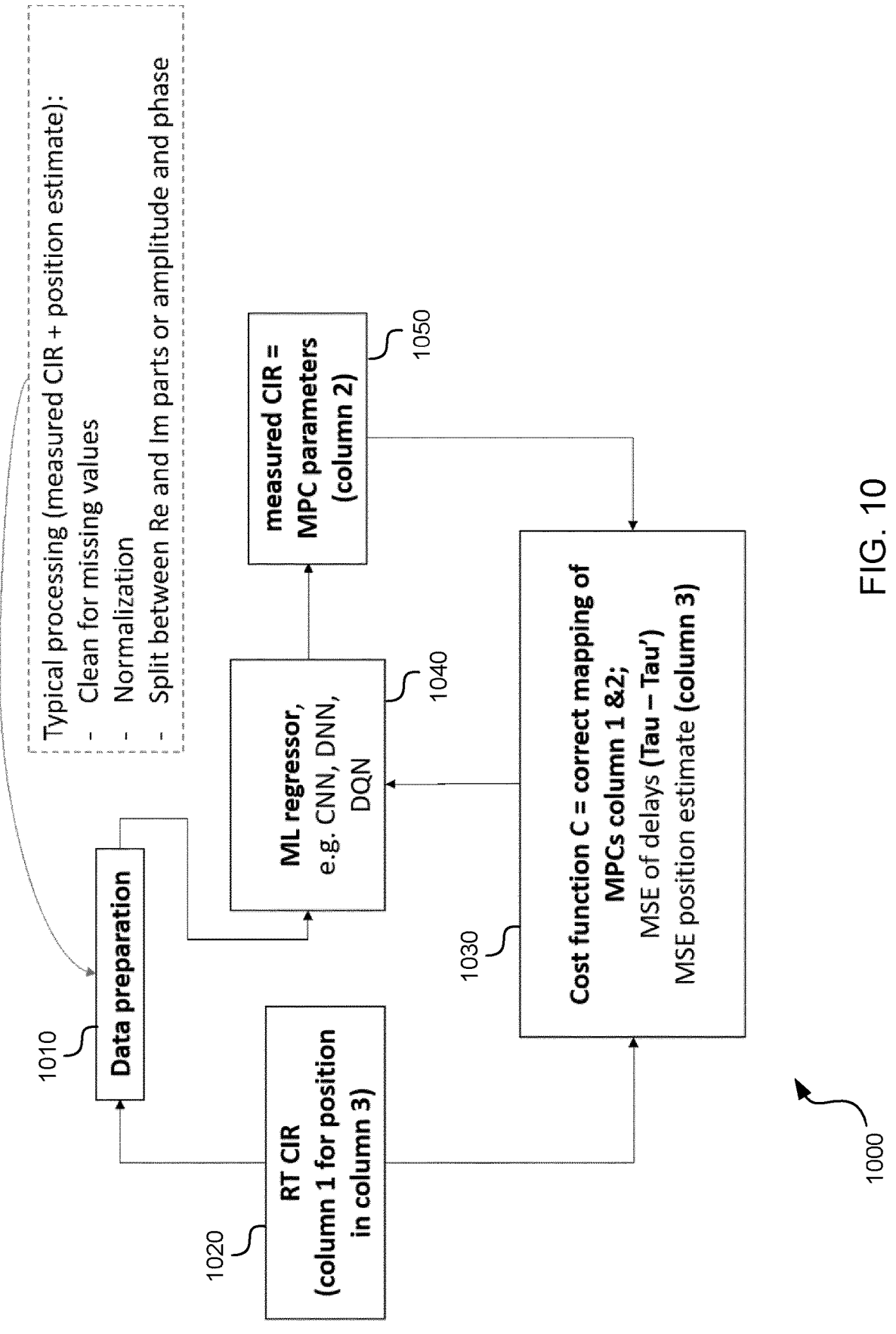
FIG. 10 illustrates an example embodiment of machine learning based mapping of ray traced and estimated multipath component parameters.

ML instance #1—MPCs parameter estimation (delay τ, amplitude α, and phase φ):

input: CSI RS and UE 110 location;
  output: delay, amplitude and phase of related MPCs;
  example architecture: reinforcement learning and deep neural network (DNN);
  example cost function: mean squared error (MSE);
  how can these input and outputs/labels be obtained?
    as input for the inference, there is the periodically transmitted CSI RS from one—or alternatively multiple—gNBs 120. Simultaneously, the UE 110 tracks its own location for each reception of the CSI RSs, which may be done e.g. by global navigation satellite systems (GNSS). This is currently possible with centimetre accuracy, and similar accuracy may be achieved in future 3GPP (3rd Generation Partnership Project) localization methods based on position reference signals (PRS).
    for tracking, some device sensor data may be added to identify accelerations or rotations of the UE 110 as further input into the ML instance, which may help the localization further.
    FIG. 9 shows a table 900 with multipath component parameters for the ray traced parameters and for parameters inferred from measurements. Here, Alpha and Alpha' are real amplitude vectors for all multipath components with delay vectors Tau and Tau' and phase vectors Detha and Detha'. (.)' indicates the parameters estimated/inferred from measurements of multipath components. The third column 903 is for the position of the UE 110 within the BVDM. The task of the related ML instance is to find the correct mapping of multipath components from the first column 901 (ray traced) with that from the second column 902 (measured/artificially corrupted).
    diagram 1000 of FIG. 10 shows a high-level illustration of a possible ML based inference of the multipath component mapping for a measured/artificially modified channel impulse response at a given UE 110 position.
    firstly, there's a data preparation phase 1010, which may use metadata like SINR, reliability and others as mentioned above to down-select the data to those promising a high mapping quality and expected to provide useful improvements for the RF characteristics of the BVDM. In addition, there may be a power normalization step, and typically the channel impulse response may be split into its real part and imaginary part (or amplitude and phase) before it is entered into an ML regressor.
    at step 1020, from the estimated UE 110 position (column 903 of table in FIG. 9), the ray tracing tool may generate the ground truth channel impulse response, i.e. the multipath component parameters from column 901 in FIG. 9.
    at steps 1040, 1050, the ML regressor may use the measured/artificially varied channel impulse to infer the related multipath component parameters from column 902 of the table 900 in FIG. 9, including the most likely mapping of the multipath component parameters from columns 901 and 902 in the table 900 of FIG. 9.

at step 1030, the cost function for training the ML regressor may include the correct mapping of ray traced and measured/artificially varied multipath components, as well as the mean square error between the estimated and ground truth position. The mapping quality may be used to update the weights of the ML regressor.

ML instance #2—mapping of MPCs to BVDM interaction points:

input: ray tracing BVDM, UE 110 location and output of ML instance #1;

output: a list of mapped multipath components to the interaction points in the BVDM, as well as the reliability values of each MPC-interaction point association;

example architecture: DNN for multi-class classification (K-means clustering), and a recurrent neural network (RNN) to keep track of changes;

example cost functions: cross-entropy (for K-means DNN), and mean squared error (for RNN);

how can these input and outputs/labels be obtained?

the main task of this ML instance #2 is to combine the reported data, i.e. the multipath component parameters plus their metadata for multiple UE positions over longer time periods and from multiple UEs at different areas within the building vector data map (BVDM). Based on an available most recent BVDM for the given scenario and the UE inputs, the ML instance may infer a map of most likely interaction points for all relevant multipath components provided by all UEs.

the accurate BVDM with respect to the geometrical dimensions (in centimetre accuracy) is assumed to be available from other means like from digital map data, LIDAR measurement campaigns, UE training, etc. The reported multi path component parameters may be used simultaneously for constant further online training of the BVDM geometry by proper mapping of the MPC delays.

the reliability of the artificial intelligence (AI)/ML based mapping of ray traced and measured multipath components may depend on many aspects, which may partly be provided by the metadata for each measured multipath component like the positioning method and its accuracy, the SINR per measurement, the UE 110 mobility, the virtual beamformer beam width, the measurement bandwidth, etc. In addition, different classes of multipath components may be distinguished.

a ray tracing simulation of all relevant multipath components may be made for a specific measured UE 110 position, and a classification of multipath components, i.e. how useful each of them is for an accurate mapping based on the above-mentioned criteria, may be made. Such a classification inference may then be done e.g. by a DNN generating a K-mean clustering for different degrees of mapping reliability. This DNN may be trained by artificially modified scenarios.

in addition, an RNN may be added to provide the main characteristics of the BVDM relevant to the mapping classification, like potential number of paths with similar delay values, or rays which might flip to a completely different path in case there are small changes in the BVDM geometry.

this classification may then be the input to another ML instance combining the multipath classification with the other metadata like the SINR, etc. as mentioned above to infer the most likely mapping of ray traced and measured multipath components together with the respective combined reliability value.

the overall output of this ML instance #2 is the list of mapped multipath components with the reliability values and the interaction points as derived from the ray tracing tool.

ML instance #3—infer RF characteristics of interaction points:

input: list mapping MPCs to interaction points;

output: RF characteristics;

example architecture: DNN;

example cost functions: accuracy (MSE) of inferred reflection, diffraction and/or transmission coefficients (phase and amplitude);

how can these input and outputs/labels be obtained?

the main task of the ML instance #3 is to infer the RF characteristics for all so far identified interaction points in the BVDM based on the list of mapped multipath components as provided by ML instance #2.

the basic idea includes a proper mapping of estimated and ray traced multipath components, and then a comparison of the amplitudes and relative phases of all received multipath components may directly provide the RF impact from the interaction points. Such an RF impact may be a certain phase shift, and/or, it may reveal a certain reflection coefficient, i.e., when only some part of the power is reflected at the interaction point with a corresponding lower amplitude for the reflected multipath component (relative to the strongest multipath component).

the ML instance may then be trained by supervised learning of a DNN to infer the best mapping of RF characteristics to interaction points. This learning may benefit from inherently trained strategies like giving more reliable multipath components a higher weight, cross-verifying RF characteristic by combining estimates from multiple UEs covering close by interaction points, identifying objects with similar RF characteristics, e.g., from visual data (digital map data, and the like), etc.

FIG. 7 shows details of an alternative implementation. In FIG. 7, there are the same three ML instances for estimation of MPC parameters (#1), for inferring of interaction points (#2) and for inferring of the RF characteristics for the BVDM. The main difference is that the ML instance #2 has been shifted from gNB side to UE side. This may result in a benefit of a potentially lower overhead for reporting due to preprocessing at UE side. So, for example, results for unreliable multipath components may be directly discarded at the UE side.

The meaning of the reported data from UE 110 to gNB 120 is different between the solutions of FIG. 6 and FIG. 7, i.e., in the first case (FIG. 6) the UE 110 reports the relevant multipath component parameters like delays, amplitudes, phase, AoA together with its evolution as well as the context information like time stamps, SINR, reliability, virtual beamformer configuration, etc. For the second option (FIG. 7), the UE 110 may report the inference of the interaction points and its RF parameters, the reliability of the inferences, and time instances. The context information may be limited to some time stamps, while SINR or virtual beam-former configurations may be omitted as this information is inherently provided by the above-mentioned reliability information for the RF characteristics, as well as by the reliability for the interaction points.

The gNB 120 may then collect from all UEs inferred interaction points with their inferred RFcharacteristics, as well as the estimated reliability. The interaction points per UE may typically cover only a subset of the overall BVDM area. The ML instance #3 at the gNB 120 has then the task of combining all the UE inputs and inferring the most likely RF characteristics for all elements comprising the BVDM. It may then output, for example, a colour coded BVDM, where the colour indicates the strength of reflection coefficients. Another colour coded BVDM may then provide the inferred phase shifts at each point of the BVDM. This information may then ideally be given specifically for different AoA and AoDs of a multipath component at a certain interaction point.

FIG. 6 and FIG. 7 include an RF inference orchestrator 640, 740. The overall procedure for inferring of multipath component parameters, inferring of interaction points, as well mapping of RF characteristics to the BVDM includes many parameters so that a higher layer orchestrator may supervise the process. For example, the need for UE measurements may depend on the degree of already inferred RF characteristics. I.e. in the beginning many UE measurements may be needed, while later on there may be more of a tracking mode to cover some long term variations of the RF characteristics. The RF orchestrator may also know which areas of the BVDM are more challenging and need more inferences and which areas already have a very accurate and stable inference available.

Other criteria may include controlling the time of reporting of data from UE 110 to gNB 120, for example, depending on the load conditions of the cell.

The ML training and inference methods disclosed here are only meant as one possible example, while other options like reinforcement learning strategies may also be considered. For example, one predefined BVDM may be taken as the environment with specific RF characteristics, and a reinforcement learning (RL) agent may try to recreate (action) these RF characteristics based on CSI estimations at the UE side for certain UE positions. The reward may include the degree of alignment of the inferred with the predefined RF characteristics.

To derive the RF characteristics, the problem may be modelled as an image-to-image translation and two Cycle GANs 1120, 1140 may be used, as shown in diagram 1100 of FIG. 11. Three "images" are needed: 1) a 2D representation 1150 of the CIR, 2) the ray tracing results 1130 with BVDM, and 3) a BVDM 1110 color-coded with the initial RF characteristics. Image 1150 may be derived from ML #1 described above, image 1130 is a direct output from ray tracing tools, and image 1110 may be generated by combining information about the material of the buildings in the BVDM and tables providing the reflection coefficient for such material. The Cycle GAN 1 1120 has images 1130 and 1110 as input and the goal is to train it to generate RF characteristics from ray tracing simulations, and vice-versa. Therefore, this training may allow updating the RF characteristics according to the ray tracing results. The Cycle GAN 2 1140 has images 1150 and 1130 as input and the goal is to find the interaction points. The cycle GAN training may try to translate CIRs to BVDMs with rays, but a subproduct of this training is a segmentation mask that identifies which parts of the BVDM are most important for the given CIR.

This implementation allows working amid impairments, e.g. noise, and/or wrong initial RF characteristics.

FIG. 12 illustrates an example flow chart of a method 1200, in accordance with an example embodiment.

At operation 1201, the apparatus 200 accesses channel state information measurements performed by the mobile node 110 for the surrounding of the network node 120 and a corresponding radio channel simulation.

At optional operation 1202, the apparatus 200 compares MPC parameters of multipath components from the accessed channel state information measurements with MPC parameters of multipath components from the accessed radio channel simulation to identify multipath components that correspond to each other.

At optional operation 1203, the apparatus 200 identifies interaction points of the identified multipath components in a data map of objects in the surrounding of the network node 120.

At operation 1204, the apparatus 200 estimates a set of RF parameters for each identified interaction point, e.g. by comparing relative differences between the MPC parameters of the multipath components from the accessed channel state information measurements and the MPC parameters of the multipath components from the accessed radio channel simulation.

At optional operation 1205, the apparatus 200 updates the identified interaction points in the data map of objects with the estimated sets of RF parameters.

At optional operation 1206, the apparatus 200 provides the estimated sets of RF parameters for storage to the network node 120 and/or the cloud-based storage 130.

At optional operation 1207, the apparatus 200 provides the updated data map of objects with the estimated sets of RF parameters to the requesting entity 140 in response to a request from the requesting entity 140.

The method of diagram 1200 may be performed by the apparatus 200 of FIG. 2. The operations 1201 to 1207 can, for example, be performed by the at least one processor 202 and the at least one memory 204. Further features of the method 1200 directly result from the functionalities and parameters of the apparatus 200, and thus are not repeated here. The method 1200 can be performed by computer program(s).

At least some of the embodiments described herein may allow enhancing a data map of objects via object specific radio frequency parameters.

At least some of the embodiments described herein may allow achieving real-world RF characteristics of a BVDM.

At least some of the embodiments described herein may allow achieving angle specific RF parameters of reflection, diffraction and transmission coefficients, which may also include RF cluster effects on fine structures with dimensions close to the wavelength.

At least some of the embodiments described herein may allow learning of RF parameters, thereby allowing adapting to varying environment conditions.

At least some of the embodiments described herein may allow an accurate mirror world, including accurate RF characteristics, which is the basis for smarter network management and smarter network operations down to the physical (PHY) layer. Herein, "smart" means having a clear understanding of the network environment, UE movements, effects due to radio channel conditions, etc.

At least some of the embodiments described herein may allow mobile network operators (MNOs) to gather over time large amounts of BVDM training data for the RF characteristics, thereby giving them a unique selling point.

At least some of the embodiments described herein may allow MNOs to provide RF maps to external users, like car navigation systems, digital map data systems, etc., which may support autonomous driving solutions with high reliability and better performance.

Due to observing varying RF characteristics of already learned BVDMs, at least some of the embodiments described herein may allow implementing sensor applications, such as identifying an open versus a closed window based on the changing reflection coefficient at the window interaction point.

The functionality described herein can be performed, at least in part, by one or more computer program product components such as software components. According to an embodiment, the apparatus 200 may comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus, comprising:
at least one processor; and
at least one memory storing instructions that, when executed with the at least one processor, cause the apparatus to at least perform:
    accessing channel state information measurements performed with a mobile node for a surrounding of a network node and accessing a corresponding radio channel simulation; and
    estimating a set of radio frequency parameters for an interaction point;
wherein the interaction point comprises a point in which a multipath component is reflected, diffracted, or transmitted to an object of a data map of objects in the surrounding of the network node.

2. The apparatus according to claim 1, wherein the instructions, when executed with the at least one processor, further cause the apparatus to at least perform:
comparing multipath component parameters of multipath components from the accessed channel state information measurements with multipath component parameters of multipath components from the accessed radio channel simulation to identify multipath components that correspond; and
identifying interaction points of the identified multipath components in the data map of objects in the surrounding of the network node,
wherein the estimating of the set of radio frequency parameters is performed with comparing relative differences between the multipath component parameters of the multipath components from the accessed channel state information measurements and the multipath component parameters of the multipath components from the accessed radio channel simulation.

3. The apparatus according to claim 2, wherein the instructions, when executed with the at least one processor, further cause the apparatus to at least perform:
updating the identified interaction points in the data map of objects with the estimated set of radio frequency parameters.

4. The apparatus according to claim 1, wherein the instructions, when executed with the at least one processor, further cause the apparatus to at least perform:
providing the estimated set of radio frequency parameters for storage to at least one of: the network node or a cloud-based storage.

5. The apparatus according to claim 4, wherein estimating the set of radio frequency parameters for the interaction point comprises estimating sets of radio frequency parameters for a plurality of interaction points; and
the estimated sets of radio frequency parameters are provided for storage per interaction point of the plurality of interaction points for multipath components for multiple mobile nodes at multiple locations over given time periods.

6. The apparatus according to claim 4, wherein the estimated set of radio frequency parameters provided for storage is for use in at least one of channel estimation and prediction, mobile node localization, or handover.

7. The apparatus according to claim 3, wherein the instructions, when executed with the at least one processor, further cause the apparatus to at least perform:

providing the data map of objects having the updated identified interaction points with the estimated set of radio frequency parameters to a requesting entity in response to a request from the requesting entity.

8. The apparatus according to claim 2, wherein the multipath component parameters of the multipath components from the accessed channel state information measurements and from the accessed radio channel simulation comprise at least one of a delay of the multipath component, an amplitude of the multipath component, a phase of the multipath component, or an angle of arrival of the multipath component.

9. The apparatus according to claim 1, wherein the data map of objects comprises a building vector data map.

10. The apparatus according to claim 1, wherein a radio frequency parameter of the set of radio frequency parameters comprises at least one of a phase shift, a reflection coefficient, a transmission coefficient, or a diffraction coefficient.

11. The apparatus according to claim 2, wherein the instructions comprise a neural network trained to perform the identifying of the multipath components that correspond with comparing the multipath component parameters of the multipath components from the accessed channel state information measurements with the multipath component parameters of the multipath components from the accessed radio channel simulation.

12. The apparatus according to claim 2, wherein the instructions comprise a neural network trained to perform the estimating of the set of radio frequency parameters for the identified interaction point with comparing the relative differences between the multipath component parameters of the multipath components from the accessed channel state information measurements and the multipath component parameters of the multipath components from the accessed radio channel simulation.

13. A method, comprising:

accessing, with an apparatus, channel state information measurements performed with a mobile node for a surrounding of a network node and accessing, with the apparatus, a corresponding radio channel simulation; and estimating, with the apparatus, a set of radio frequency parameters for an interaction point;

wherein the interaction point comprises a point in which a multipath component is reflected, diffracted, or transmitted to an object of a data map of objects in the surrounding of the network node.

14. A non-transitory program storage device readable with an apparatus tangibly embodying a program of instructions executable with the apparatus to perform operations, the operations comprising:

accessing channel state information measurements performed with a mobile node for a surrounding of a network node and accessing a corresponding radio channel simulation; and estimating a set of radio frequency parameters for an interaction point;

wherein the interaction point comprises a point in which a multipath component is reflected, diffracted, or transmitted to an object of a data map of objects in the surrounding of the network node.

15. The non-transitory program storage device according to claim 14, wherein the operations further comprise:

comparing multipath component parameters of multipath components from the accessed channel state information measurements with multipath component parameters of multipath components from the accessed radio channel simulation to identify multipath components that correspond; and identifying interaction points of the identified multipath components in the data map of objects in the surrounding of the network node, wherein the estimating of the set of radio frequency parameters is performed with comparing relative differences between the multipath component parameters of the multipath components from the accessed channel state information measurements and the multipath component parameters of the multipath components from the accessed radio channel simulation.

16. The non-transitory program storage device according to claim 15, wherein a first neural network is trained to perform the identifying of the multipath components that correspond with comparing the multipath component parameters of the multipath components from the accessed channel state information measurements with the multipath component parameters of the multipath components from the accessed radio channel simulation; and a second neural network is trained to perform the estimating of the set of radio frequency parameters for the identified interaction point with comparing the relative differences between the multipath component parameters of the multipath components from the accessed channel state information measurements and the multipath component parameters of the multipath components from the accessed radio channel simulation.

17. The non-transitory program storage device according to claim 14, wherein the data map of objects comprises a building vector data map.

18. The method according to claim 13, further comprising:

comparing multipath component parameters of multipath components from the accessed channel state information measurements with multipath component parameters of multipath components from the accessed radio channel simulation to identify multipath components that correspond; and identifying interaction points of the identified multipath components in the data map of objects in the surrounding of the network node, wherein the estimating of the set of radio frequency parameters is performed with comparing relative differences between the multipath component parameters of the multipath components from the accessed channel state information measurements and the multipath component parameters of the multipath components from the accessed radio channel simulation.

19. The method according to claim 18, wherein a first neural network is trained to perform the identifying of the multipath components that correspond with comparing the multipath component parameters of the multipath components from the accessed channel state information measurements with the multipath component parameters of the multipath components from the accessed radio channel simulation; and a second neural network is trained to perform the estimating of the set of radio frequency parameters for the identified interaction point with comparing the relative differences between the multipath component parameters of the multipath components from the accessed channel state information measurements and the multipath component parameters of the multipath components from the accessed radio channel simulation.

20. The method according to claim 13, wherein the data map of objects comprises a building vector data map.

* * * * *